Feb. 24, 1970    J. V. GOODMAN ET AL    3,497,808
ACCELERATION SENSITIVE LOCATING TRANSMITTER
Filed March 28, 1966
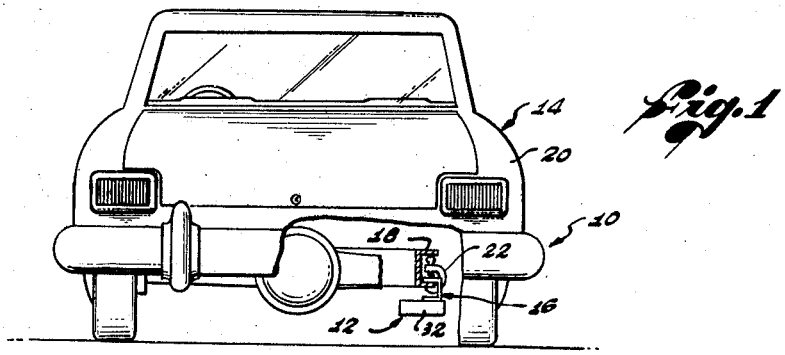
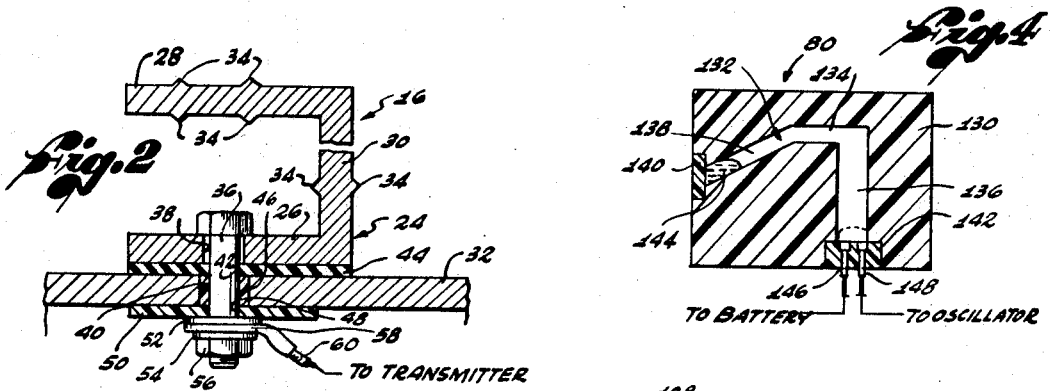
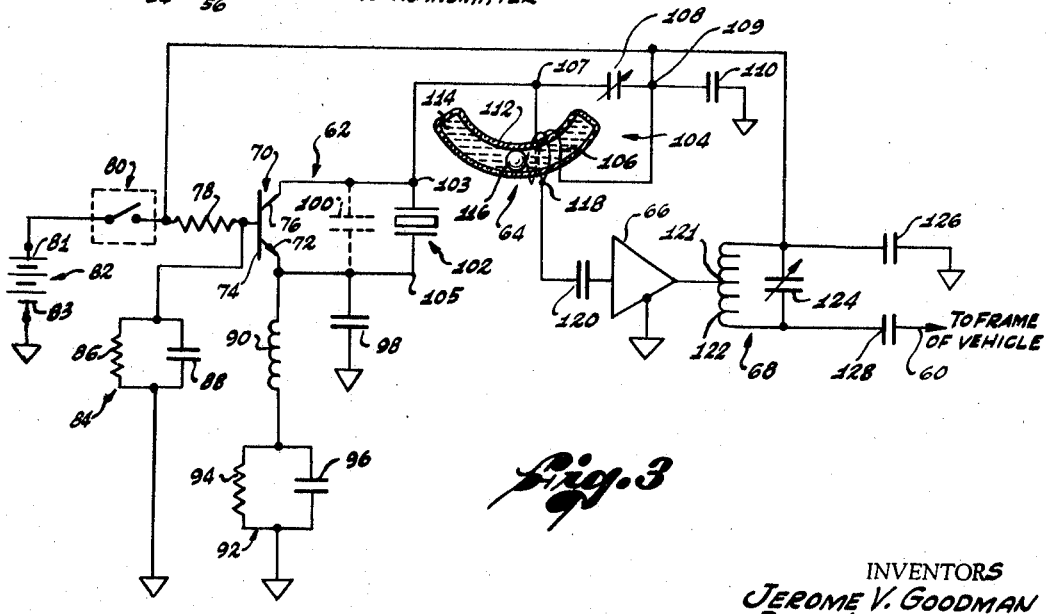
INVENTORS
JEROME V. GOODMAN
JOHN MACADAM
BY Fulwider, Patton, Rieber,
Lee, and Utecht
ATTORNEYS

United States Patent Office 3,497,808
Patented Feb. 24, 1970

3,497,808
ACCELERATION SENSITIVE LOCATING
TRANSMITTER
Jerome V. Goodman, Inglewood, and John Macadam,
Pasadena, Calif., assignors to South Bay Associates,
Inglewood, Calif., a partnership consisting of Jerome
V. Goodman, John Macadam and Martin Ross
Filed Mar. 28, 1966, Ser. No. 537,937
Int. Cl. H02b 1/04; B60q 9/00
U.S. Cl. 325—113                           1 Claim

ABSTRACT OF THE DISCLOSURE

A signal transmitting apparatus mountable on the underside of a vehicle and providing an output signal variable in frequency in accordance with movements of the vehicle. The apparatus is electrically connected to the vehicle so that the vehicle serves as the antenna for the transmitter. A crystal is loaded by means of a resonant circuit so that the output frequency of the transmitter is below the natural series resonant frequency of the crystal. An inductor in the resonant circuit is variable in response to acceleratory movements of the vehicle to vary the output frequency of the transmitter.

---

The present invention relates to signal transmitting apparatus and more specifically to an improved transmitter apparatus particularly suited to use in a vehicle tracking or surveillance system.

Vehicle surveillance or tracking is but one activity of law enforcement officers. It becomes a very important phase of police work, however, when a suspect or known criminal is to be followed. In such cases, it is important that the officer following the suspect remain close enough to the suspect, as to be able to follow his every movement, and at the same time remain far enough behind the suspect, as not to be noticed or detected. Often, it is impossible for the officer to maintain such an ideal separation from the suspect's vehicle, particularly when the suspect is driving in residential areas and making numerous turns. In such instances, the pursuing officer must remain very close to the suspect, often resulting in his being detected or run the risk of losing the suspect, which also often occurs.

Because of the obvious shortcomings of visual surveillance of moving vehicles, electronic apparatus have been proposed as a substitute. Such electronic apparatus are commonly known as "homers" and include a transmitter hidden in or attached to the subject's vehicle for transmitting electrical signals to a receiver in the pursuing officer's car. Location of the suspect's vehicle as it changes direction is currently determined by the utilization of conventional RDF (Radio Direction Finding) techniques.

Unfortunately, such electronic apparatus have several basic shortcomings, many of which center around the antenna of the homer and associated RDF equipment. In particular, in urban areas, RDF equipment operation is handicapped by multiple reflections from nearby objects which result in incorrect directivity information.

As to the antenna, presently available homers utilize a separate antenna on the outside of the vehicle and a two wire feed to the antenna from the signal transmitter. One of the feed wires is connected to the metal frame or body of the vehicle which acts as a ground return for the transmitter and the antenna. This means that the antenna must be insulated from the frame and body of the car as is the case with the antenna for conventional car radios. In conventional transmitters for vehicles, such insulation is not a serious problem since the antenna may be mounted by an insulator to extend outwardly from the body of the vehicle. In the case of homers, however, it is important that the antenna not be seen or noticed by the suspect.

To hide an antenna on the outside of a vehicle and at the same time make sure that it is insulated from the vehicle's metal frame and body is an extremely difficult task which takes a considerable amount of time. Usually, the suspect does not leave his car unattended for such lengths of time resulting either in an improper antenna connection or no connection at all.

In addition to the foregoing, it is important that the signals generated by the homer not interfere or be interfered with signals from other transmitters. This means that the homer must operate within an unused frequency band, not propagated by ionospheric reflection, which in practice is usually a relatively high frequency band, over 20 megacycles. It is also very desirable that the homer be stable in its operation and that the frequency of the signals generated thereby provide an accurate indication of either the speed or acceleration of the vehicle to which it is attached: In general, this means that the homer comprise an F-M transmitter having a crystal oscillator. Unfortunately, however, crystal oscillators generally are variable in frequency only over a very narrow bandwidth, if the stability of the oscillator is to be maintained. This poses a distinct limitation upon the accurate response range of conventional homers to changes in the acceleration of the vehicle to which they are attached.

Because of the foregoing problems, presently available homers have enjoyed only a very limited use by the police and law enforcement agencies.

Accordingly, it is a general object of the present invention to provide an improved transmitter apparatus for vehicle surveillance and tracking systems which overcomes the disadvantages associated with presently available homers.

Another object of the present invention is to provide a transmitter of the foregoing character which may be rapidly connected to the frame or body of a vehicle in locations which are outside the normal viewing range of a suspect.

A further object of the present invention is to provide a transmitter of the foregoing character which does not require isolation or insulation of an antenna from the body or frame of the vehicle to which it is attached.

Still another object of the present invention is to provide a signal transmitter which does not require a separate antenna but which rather employs the body and frame of the vehicle as its antenna.

A still further object of the present invention is to provide a signal transmitter including a crystal oscillator which is capable of a broad frequency deviation while maintaining a high degree of amplitude stability for the signals generated thereby.

It is another object of the present invention to provide a transmitter of the foregoing type including acceleration sensitive means for automatically controlling and adjusting the frequency of the signals generated by the oscillator, thereby rendering the transmitter ideally suited to use in vehicle surveillance and tracking systems.

The foregoing as well as other objects and advantages of the present invention may be more clearly understood by reference to the following detailed description when considered with the drawing which, by way of example only, illustrates one form of transmitter apparatus embodying the features of the present invention.

In the drawing:

FIGURE 1 is a rear view of a motor vehicle with a portion broken away to show the transmitter apparatus attached to the frame of the vehicle;

FIGURE 2 is a fragmentary sectional view of one form of the connector of the signal transmitter apparatus;

FIGURE 3 is a circuit diagram of a signal transmitter ideally suited to use in the transmitter apparatus and including a crystal oscillator adjustable over a broad band of frequencies and including novel means for maintaining a high degree of amplitude stability over said range of frequencies; and FIGURE 4 is a cross-sectional view of one form of acceleration sensitive self-latching switch for use in the transmitter illustrated in FIGURE 3.

In general, the transmitter apparatus of the present invention overcomes the antenna mounting, insulation and hiding problems of conventional homers by utilizing the metal body of the vehicle as the antenna for its transmitter. This is accomplished by utilizing a single wire feed from the output of the transmitter to the body of the vehicle without an antenna ground reference. This is somewhat similar to the two wire transmission line with single wire end feed utilized in "Zeppelin" or "Zepp" antennas.

The mechanism of such a feed is perhaps somewhat difficult to visualize, since only one of the transmitter output terminals is connected to the vehicle body. The difficulty lies in the natural tendency to think in terms of current flow in ordinary electrical circuits, where it is necessary to have a complete loop between both terminals of the power source before any current can flow at all. But this limitation applies only to circuits in which the electromagnetic fields reach the most distant part of the circuit in a time interval that is negligible in comparison with the time of one cycle. When the circuit dimensions are comparable with the wavelength no such complete loop is necessary. Here the body of the vehicle is an example of an "open" circuit in which large currents can flow.

In view of the conventional practice of using a two wire feed to the antenna of a vehicle, the present invention's use of the body of the vehicle as an antenna produces totally unexpected, yet satisfactory results. Also, it has been found that the metal bodies of cars possess an extremely low Q due to large circumference to length ratios and because the capacitance between bodies and ground is relatively large. Therefore, in the case of cars and other ground vehicles, impedance mismatch between the output of the transmitter and vehicle's body has a minimal effect upon the signal energy radiated by the body as an antenna for the transmitter.

The use of the body of a vehicle as the antenna for the transmitter, of course, does away with all problems of concealing the antenna from the sight of a suspect and eliminates the previously referred to problems of antenna insulation. Furthermore, it allows the attachment piece for the transmitter to the body of the vehicle to act both as a physical connector for the transmitter to the vehicle and as the electrical connection for the transmitter to its antenna.

One form of such a connector is illustrated in FIGURES 1 and 2 for an automobile wherein the transmitter apparatus is represented generally by the numeral 10, the signal transmitter by the numeral 12, the vehicle by the numeral 14 and the connector by the numeral 16. The connector 16 is ideally suited for connection to the metal frame 18 carrying and electrically connected to the metal body 20 of the vehicle 14. In the illustrated form, the connector 16 is coupled to the frame by a conventional C-clamp 22.

As shown most clearly in FIGURE 2, the connector 16 comprises a generally U-shaped metal bracket 24 including horizontal legs 26 and 28 joined by a vertical leg 30. The leg 26 is adapted for connection to the top of the housing 32 for the transmitter 12, while the horizontal leg 28 and the vertical leg 30 are adapted for connection to the frame 18 of the vehicle 14. To this end the horizontal leg and vertical leg each includes outwardly extending spikes 34 for piercing any paint or foreign debris covering the frame to which the connector 16 is to be attached, thereby insuring a complete electrical connection between the frame and the connector.

The leg 26 of the connector 16 is pivotally mounted on top of the metal housing 32 by a metal bolt 36. The bolt 36 passes downward through communicating openings or holes 38, 40 and 42 in the arm, the top of the metal housing, and in a strip 44 of insulating material between the leg and the housing. In addition to the strip 44, a washer 46 of insulating material surrounds the bolt 36 within the hole 40 to prevent electrical contact between the bolt and the housing. Inside the housing, the bolt 36 passes through a hole 48 in a strip 50 of insulating material and through a pair of metal washers 52 and 54 to receive a nut 56. The nut 56 tightly secures an end 58 of the output wire 60 of the transmitter 12 between the washers 52 and 54 and the connecter 16 in place over the top of the housing.

Referring more particularly to FIGURE 3, there is illustrated a preferred form of the transmitter 12. Basically, the transmitter 12 comprises a common base transistor, Colpitts-type crystal oscillator 62 including acceleration sensitive means 64 for automatically controlling the frequency of the signals generated by the oscillator over a broad band of frequencies, when compared with conventional crystal oscillators. The frequency of the signals generated by the oscillator therefore provides an accurate indication of the acceleration of the transmitter and hence the vehicle to which it is attached. The signals generated by the oscillator 62 are amplified by an isolating amplifier 66 and applied to an output circuit 68 for transmission of the body 20 of the vehicle to a remote receiver.

At the receiver, the signals are demodulated to provide either a visual or audio indication of the acceleration of the vehicle being followed. By monitoring the signals being received at the receiver, and correlating the information to change of direction of the followed vehicle, it is possible to remotely track the followed vehicle. In this regard, the transmitter 12 may be arranged to change frequency, from a normal operating frequency, when the followed vehicle turns either to the left or to the right. For instance, the generated frequency may increase when the vehicle turns to the right and decrease when it turns to the left. Also, vertical physical vibration of the followed vehicle produces a variation in the loading and gain of the body as an antenna and hence causes an amplitude modulation of the signal generated by the transmitter. In addition, lateral vibration produces cyclic frequency changes of a shorter time constant than would obtain from vehicle direction changes. The magnitude of the amplitude modulation, as well as the cyclic frequency changes may be utilized as indications of the speed of the moving vehicle. By knowing the speed of the moving vehicle and its direction of travel, it is a simple matter to track the moving vehicle.

More specifically, in the transmitter 12 of FIGURE 3, the oscillator 62 is a Colpitts oscillator comprising a N-P-N type transistor 70 arranged in a common base configuration and including an emitter 72, base 74, and collector 76. An input resistor 78 is connected to the base 74 in series with an acceleration sensitive switch 80 and the positive pole 81 of a battery 82, the negative pole 83 of the battery being connected to a common reference. The base 74 is also connected to a parallel circuit 84 including a biasing resistor 86 and bypass capacitor 88 connected to the common reference.

The emitter 72 of the transistor 70 is connected to an RF choke 90 in series with a parallel circuit 92 comprising an emitter biasing resistor 94 and a bypass capacitor 96, connected to the common reference. In addition, a capacitor 98 is connected between the emitter 72 and the common reference. The capacitor 98 forms an impedance bridge with the internal emitter to collector shunt capacitance of the transistor 70, here represented in phantom outline and denoted by the numeral 100. If desired, an additional capacitor may be connected between the emitter and collector terminals. The external capacitor may be variable such that the impedance bridge formed with the capacitor 98 may be adjusted to any desired impedance ratio. As will be described in greater detail, the impedance bridge functions in the oscillator 62 to provide one source of signal amplitude stability allowing the frequency of the oscillator output signals to be varied linearly over a broad frequency range.

In addition to the internal shunt capacitance 100, a crystal 102 is connected between the emitter and collector terminals of the transistor 70. The crystal 102 comprises the feedback path for the oscillator and the operating frequency of the crystal controls the frequency of the output signals of the oscillator. In this regard, the crystal 102 is preferably an overtone crystal and by way of example may be a third overtone crystal in order that the oscillator may operate at relatively high frequencies (above 20 mc.). It should be noted, however, that the type of crystal places no limitation on the basic oscillator circuit and the principles thereof are applicable to higher and lower overtone crystals as well as to fundamental frequency crystals. As with all types of crystals, the crystal 102 possesses a natural series resonant frequency, $f_s$. At $f_s$, the crystal has a maximum signal output and a minimum impedance while at frequencies other than the $f_s$, the impedance presented by the crystal 102 is increased and the signal output reduced. The crystal 102 also possesses a parallel resonant frequency $f_p$, the value of which may be controlled and is determined by the electrode and circuit capacitance and inductance shunting the crystal. At $f_p$, the crystal presents a maximum impedance.

By way of definition, when a crystal oscillator is operating at a frequency at which its crystal presents a minimum impedance, it is said to be operating in a series resonant mode. Also, above $f_s$, a crystal is said to be operating in an inductive condition, and below, in a capacitive condition. In the oscillator circuit of the present invention, the crystal 102 operates in a series resonant mode over a broad frequency range less than $f_s$. By operating in a substantially capacitive condition rather than an inductive condition, as is usual practice for low frequency oscillators, spurious modes above $f_s$ are avoided. Also, by operating below $f_s$, the oscillator has proven to be variable in a linear manner over a much broader range of frequencies than conventional crystal oscillators.

To cause the oscillator 62 to operate below $f_s$ over such a broad range of frequencies, the present invention provides means for presenting a variable inductive reactance to the crystal 102. More particularly, starting with a negligible shunt inductive reactance, it has been found that the addition of relatively large inductive reactance will cause the crystal to operate below $f_s$. Thereafter, however, a linear relationship exists between the inductive reactance and the frequency of operation of the crystal and small changes in the inductive reactance produce relatively large changes in the operating frequency of the crystal. It is over this linear range that the oscillator 62 is caused to operate. In fact, the initial starting point for operation of the oscillator 62 is at a frequency far below $f_s$ and well within the linear range. Therefore, increases and decreases in the effective inductive reactance presented to the crystal 102 will produce linear decreases and increases in the operating frequency of the crystal and hence similar changes in the frequency of the output signals generated by the oscillator.

In the illustrated form, the means for presenting an inductive reactance to the crystal 102 comprises a tank circuit 104 including a coil 106 and a variable capacitor 108 connected in parallel. One junction 107 of the coil and capacitor is connected to a terminal 103 of the crystal 102 while the other junction 109 is connected through a bypass capacitor 110 to the common reference and through the switch 80 to the positive pole 81 of the battery 82. Thus arranged, the capacitor 98 forms a part of a resonant circuit shunting the crystal 104 and functions as a coupling capacitor between the junction 109 of the tank circuit and a terminal 105 of the crystal to couple predetermined portions of signal energy from the tank circuit to the crystal, depending upon the value of the capacitor 98.

The tank circuit 104 is designed to have a natural resonant frequency less than $f_s$. This presents an inductive reactance to the crystal 102 causing the crystal to operate in a series resonant mode at frequencies less than $f_s$.

The effective value of the inductive reactance presented by the tank circuit 104 may be controlled either by controlling the value of the inductance of the coil 106 or the capacitance presented by the variable capacitor 108 since changes in either will vary the natural resonant frequency of the tank circuit.

In the illustrated form, the frequency varying means for the tank circuit 104 is represented by the numeral 64 and includes apparatus for varying the inductance of the coil 106 in accordance with the acceleration of the transmitter 12. Preferably, the frequency varying apparatus 64 includes a generally U-shaped glass tube 112 sealed at both ends and enclosing a quantity of oil 114 or other viscous fluid and a metal ball 116. The tube 112 is supported by the transmitter housing 32 to lie in the indicated plane with the ball 116 normally resting at the middle of the tube. The coil 106 is wound around the tube 112 to one side of its mid-point such that the ball 116 lies just at the edge of the first winding of the coil. As the transmitter 12 moves with the vehicle 14 in response to a left-hand turn, the ball 116 travels into the coil 106. When the vehicle turns to the right, the ball 116 travels away from the coil. When the vehicle is traveling straight ahead, the ball 116 returns to its normal position at the middle of the tube 112.

If the ball 116 is formed of steel, brass or aluminum, movement into the coil 106 reduces the inductance of the coil with an increase in the resonant frequency of the tank circuit 104. The increase in the resonant frequency of the tank circuit appears as a reduction in the inductive reactance to the crystal 102 and causes an increase in the operating frequency of the crystal and hence an increase in the output frequency generated by the oscillator 62.

As the ball 116 moves away from the coil 106, the inductance of the coil increases with a decrease in the resonant frequency of the tank circuit 104. The reduction of the resonant frequency of the tank circuit appears as an increase in the inductive reactance to the crystal 102 and results in a reduction in the frequency of operation of the crystal and hence a reduction in the output frequency of the oscillator. The opposite results occur if the ball is formed of powdered iron or ferrite material.

In this manner, acceleration of the transmitter 12 to the right or to the left with a turning of the vehicle 14 produces a de-tuning of the tank circuit 104 from its initial resonant frequency with a corresponding change in the frequency of the signals generated by the oscillator 62. This provides an indication of the direction of the acceleration of the vehicle and as previously described, provides means for determining the direction of travel of the vehicle to which the transmitter 12 is connected. It should be noted, that the tuning of the tank circuit 104 need not be restricted to a right and left acceleration of the vehicle 14. For example, fore and aft acceleration can be sensed by orienting the tube in a forward to rear direction with respect to the vehicle. Also, more than one means may be included for simultaneously de-tuning the tank circuit 104.

In the transmitter 12, while the frequency of the output signal generated by the oscillator 62 is varied over the broad range of frequencies, a high degree of signal amplitude stability is maintained. In the present invention, three separate features combine to produce the desired amplitude stability and each exercises some control over the amplitude of the feedback signal flowing in the emitter-collector circuit of the transistor to prevent the oscillator from dropping out of oscillation.

One of the features comprises the biasing resistors for the transistor 70. In particular, as the feedback signal passing through the crystal 102 and the emitter to collector circuit of the transistor increases, there is an increase in the voltage drop across the emitter biasing resistor 94. Also, the base of the transistor draws more current to produce an increase in the voltage drop across the biasing resistor 86. Such a change in the biasing transistor 70 causes the transistor to be less conductive and reduces the current flow in the emitter to collector circuit. Similarly, when there is a reduction in the feedback signal, the reverse operation takes place with an increase in the conductivity of the transistor.

Secondly, the parameters of the oscillator 62, and particularly the biasing resistors are selected such that the transistor 70 normally operates at a point where an increase current flow in the emitter-collector circuit is accompanied by a decrease in the current gain of the transistor. Thus, when there is a decrease in the feedback signal in the emitter to collector circuit of the transistor 70, there is an increase in current gain to compensate for the decrease in feedback. Likewise, when there is an increase in the feedback signal, there is a reduction in current gain to compensate for the increase in feedback.

The third amplitude stabilizing means is the impedance bridge formed by the capacitor 98 and the capacitance across the emitter to collector circuit, being the internal shunt capacitance 100, alone or in parallel with a separate external capacitor. In particular, in Colpitts-type oscillators, for a minimum feedback loss, the ratio of the capacitive reactance of the shunt capacitance to the capacitor 98 should be approximately equal to the ratio of the output to input impedances of the transistor 70. In the present invention, however, the capacitance ratio is selected to be somewhat less than the impedance ratio at $f_s$. For example, the capacitance ratio may be approximately 0.7 of the impedance ratio meaning that the minimum feedback loss will occur at an output frequency substantially less than $f_s$—the output impedance of the transistor circuit increasing as the frequency of oscillation decreases from $f_s$. In practice, the oscillator circuit always operates above the frequency at which the capacitive-impedance ratios are equal. Therefore, as the output signal frequency of the oscillator 62 decreases, there is an increase in the transistor output impedance and a natural decrease in the amplitude of the feedback signal through the transistor 70. As this occurs, however, there is an improvement in the capacitance to impedance ratio and a reduction in the feedback signal losses which compensate for the reduced feedback signal amplitude. The opposite result occurs when there is an increase in the operating frequency of the oscillator—the output impedance of the transistor 70 decreasing with an increase in the feedback signal losses to compensate for the natural increase in the amplitude of the feedback signal through the transistor.

Thus, the variable inductive reactance presented by the tank circuit 104 to the crystal 102 causes the oscillator 62 to operate over a broad frequency range in a linear manner. The biasing for the transistor 70 as well as the impedance bridge arrangement insures amplitude stability for the output signal as the operating frequency of the oscillator 62 is varied by controlling the resonant frequency of the tank circuit 104.

As previously described, the output of the oscillator 62 is amplified by the amplifier 66, and applied to the output circuit 68 for transmission by the body of the vehicle 14, the body acting as the antenna for the transmitter 12. Here, the output signal is taken from a tap 118 on the coil 106 which is connected to the input of the amplifier 66 by a coupling capacitor 120. One input and one output of the amplifier are connected to the common reference as illustrated. The other output of the amplifier 66 is connected to a tap 121 on a coil 122 in the output circuit 68. The coil 122 is shunted by a variable capacitor 124 one terminal of which is connected to the positive pole 81 of the battery 82 through the switch 80 and to the common reference through a bypass capacitor 126. The other terminal of the capacitor 124 is connected through a coupling capacitor 128 to the output wire 60 and hence to the frame of the vehicle 14.

To conserve power, it is desirable that the transmitter 12 only operate upon movement of the vehicle 14 to which it is attached. Accordingly, the acceleration-sensitive switch 80 is connected between the battery 82 and the oscillator circuit 62, and preferably is the form illustrated in FIGURE 4. As represented, the acceleration-sensitive switch 80 includes a block 130 of insulating material supported in the transmitter in the position illustrated and comprising a passageway 132 through the block. The passageway 132 includes a generally horizontal portion 134, a vertical portion 136 communicating one end of the horizontal portion and an inclined portion 138 communicating with an opposite end of the horizontal portion and extending downward away from the vertical portion. Plugs 140 and 142 of insulating material seal off the inclined and vertical portions of the passageway. A quantity of mercury 144, or other conductive material, is normally located at the bottom of the inclined portion 138 against the plug 140. A pair of electrical terminals 146 and 148 are located within the plug 142 at the bottom of the vertical passageway 136 and extend upward therethrough. The terminal 146 is connected to the positive pole of the battery 82 while the terminal 148 is connected to the input resistor 78 leading to the base of the transistor 70.

When the transmitter 12 is connected to the vehicle 14, it is attached thereto in a manner such that the acceleration-sensitive switch 80 is in the position illustrated in FIGURE 4, with the inclined passageway 138 in line with the direction of movement of the vehicle. At the same time, the glass tube 112 lies normal to the inclined passageway 138 to be acceleration responsive to left and right turns of the vehicle. As the vehicle accelerates, the body of mercury 144 travels up the inclined passageway 138 into the horizontal portion 134 and downward into the vertical portion 136 to complete electrical circuit between the battery 82 and the oscillator 62. The slope of the inclined portion 138 determines the magnitude of the acceleration required to complete the circuit and hence close the switch 80. Accordingly, the switch defines an acceleration-sensitive, self-latching switch, in that once operated, it remains in its closed position until deliberately opened, as by a turning over of the transmitter 12.

From the foregoing description, it is appreciated that the transmitter apparatus of the present invention is designed for easy and rapid connection to the frame or body of a vehicle to be followed, and does not require antenna or insulation or isolation in that it utilizes the metal body of the vehicle as its antenna. Further, the transmitter includes a novel crystal oscillator which is variable over a broader frequency band than conventional crystal oscillators, and is at the same time extremely stable over this broad frequency range to provide an accurate indication of the direction of travel of the vehicle to which the transmitter is attached.

While a particular form of transmitter apparatus has been described in some detail herein, changes and modifications may be made in the illustrated form without departing from the spirit of the invention. It is therefore intended that the present invention be limited in scope only by the terms of the following claims.

We claim:

1. Signal transmitting apparatus for a vehicle, comprising:

a vehicle including a metal body;

a high frequency transmitter having at least one antenna output terminal, said transmitter including a power source, a variable frequency oscillator and acceleration sensitive means for varying the frequency of the signals generated by said oscillator;

a self-latching switch in series with said power source and said transmitter for closing upon a predetermined acceleration of said transmitter, said self-latching switch including a block of insulating material having a passageway therein including a central, generally horizontal portion, a generally vertical portion connected to said central portion and extending downwardly therefrom, and an inclined portion connected to said central portion at a point spaced from said vertical portion and inclined downward from said central portion away from said vertical portion, said switch further including electrical terminals spaced from each other and connected to said power source and to said oscillator, said terminals being located at a lower end of said vertical portion, and a movable body of electrical conductive material stationed in said inclined portion and adapted for movement from said inclined portion, through said central portion and into said vertical portion to complete a circuit between said terminals upon a predetermined acceleration of said block; and means for connecting said at least one antenna output terminal to said body such that said body defines an antenna for said transmitter.

References Cited

UNITED STATES PATENTS

| | | | |
|---|---|---|---|
| 2,110,016 | 3/1938 | Fyler | 343—712 |
| 2,149,808 | 3/1939 | Ellis | 325—115 |
| 2,225,668 | 12/1940 | Subkow et al. | 331—181 X |
| 2,267,266 | 12/1941 | Brown | 343—712 |
| 2,535,207 | 12/1950 | Hook et al. | 200—61.47 |
| 2,792,478 | 3/1957 | Ackerman | 200—152 |
| 2,825,813 | 3/1958 | Sperling | 331—116 |
| 3,157,854 | 11/1964 | Riley | 340—262 X |
| 3,299,356 | 1/1967 | Bornhorst et al. | 325—111 X |
| 2,828,413 | 3/1958 | Bowers | 325—361 X |

ROBERT L. GRIFFIN, Primary Examiner

B. V. SAFOUREK, Assistant Examiner

U.S. Cl. X.R.

200—61.45, 61.47; 325—117, 119, 169; 343—717